United States Patent [19]
Konuma

[11] Patent Number: 5,650,643
[45] Date of Patent: Jul. 22, 1997

[54] DEVICE FOR RECEIVING LIGHT USED IN CCD IMAGE SENSOR OR THE LIKE

[75] Inventor: Kazuo Konuma, Tokyo, Japan

[73] Assignee: NEC Corporation, Tokyo, Japan

[21] Appl. No.: 408,032

[22] Filed: Mar. 21, 1995

[30] Foreign Application Priority Data

Mar. 30, 1994 [JP] Japan ................................ 6-059712

[51] Int. Cl.⁶ ................ G03B 3/00; H01J 40/14; H01L 27/14
[52] U.S. Cl. .................. 257/225; 257/444; 257/222; 257/84; 257/80; 257/239; 257/228; 257/233; 348/226; 348/228; 348/294; 348/297; 348/310
[58] Field of Search .................. 257/222, 443, 257/233, 223, 225, 226, 227, 228, 229, 239, 444, 80, 83, 84; 348/297, 302, 307, 308, 310, 294, 221, 228, 229, 230

[56] References Cited

U.S. PATENT DOCUMENTS

| | | | |
|---|---|---|---|
| 4,407,010 | 9/1983 | Baji et al. | 257/443 |
| 4,419,696 | 12/1983 | Hamano et al. | 257/293 |
| 4,623,927 | 11/1986 | Hoshino | 358/213 |
| 4,643,557 | 2/1987 | Ishizaki et al. | 354/406 |
| 4,839,235 | 6/1989 | Kyomasu et al. | 257/290 |
| 4,843,417 | 6/1989 | Ishida et al. | 354/408 |
| 5,198,660 | 3/1993 | Yokoyama et al. | 250/214 |
| 5,241,167 | 8/1993 | Suzuki et al. | 250/201.8 |
| 5,352,897 | 10/1994 | Horikawa et al. | 257/428 |
| 5,479,208 | 12/1995 | Okumura | 348/301 |

FOREIGN PATENT DOCUMENTS

| | | | |
|---|---|---|---|
| 57-172482 | 10/1982 | Japan . | |
| 0154565 | 8/1985 | Japan | 257/239 |
| 61-1774 | 1/1986 | Japan . | |
| 61-48704 | 3/1986 | Japan . | |
| 62-11293 | 3/1987 | Japan . | |
| 62-503196 | 12/1987 | Japan . | |
| 64-26975 | 1/1989 | Japan . | |
| 1103378 | 4/1989 | Japan . | |
| 3150536 | 6/1991 | Japan . | |

Primary Examiner—Tom Thomas
Assistant Examiner—Alexander Oscar Williams
Attorney, Agent, or Firm—Whitham, Curtis, Whitham & McGinn

[57] ABSTRACT

A light receiving device includes, in addition to a photodiode and a reset element, a comparator formed by a first and a second MOS transistor and a counter. The comparator compares an output potential of the photodiode applied to a gate electrode of the first MOS transistor with a threshold potential externally applied to a gate electrode of the second MOS transistor. The counter counts a time duration from a point of time when the photodiode is reset by the switching element to a point of time at which the output potential of the photodiode exceeds the threshold potential, and outputs the time duration in a numeral value corresponding to the quantity of light incident on the photodiode. The required light sensitivity can be maintained even when the quantity of light is either large or small. Also, non-destructive reading can be carried out.

2 Claims, 3 Drawing Sheets

DEVICE FOR RECEIVING LIGHT USED IN CCD IMAGE SENSOR OR THE LIKE

BACKGROUND OF THE INVENTION

(1) Field of the Invention

The present invention relates to a light receiving device which is used in, for example, a Charge-Coupled Device (CCD) image sensor, and to a method for driving such a light receiving device.

(2) Description of the Related Art

An example of a conventional light receiving device and a method for driving the same, to which the present invention relates, are shown respectively in FIGS. 1A and 1B. The light receiving device shown in FIG. 1A is constituted by a transfer gate element 1 and a reverse biased photodiode 3 which also has an electron charge storage function represented by a capacitor 2. Research is underway on an interline type CCD image sensor which incorporates such a light receiving device and a charge coupled device (CCD).

Actual operation of the light receiving device is explained with reference to FIGS. 1A and 1B. In the diagrams, VL1 is maintained at a 0-volt potential and VH1 at a positive potential. When the light receiving device is combined with a CCD, VH1 is connected to a channel section of the CCD. To a terminal TG which is connected to a gate electrode of the transfer gate element 1 is applied a pulse potential as shown in FIG. 1B. When the VHO that is the ON-voltage is applied to the TG terminal, the photodiode 3 changes to a reverse biased state. Subsequently, when the VLO voltage that is the OFF-voltage of the transfer gate element is applied to the TG terminal, the potential of a PDOUT terminal which is one end (cathode) of the photodiode 3 undergoes changes dependent on the quantity of incident light, as shown in FIG. 1B, with lapse of time. In FIG. 1B, a curved line marked "a" indicates that the quantity of incident light is larger than that of each of "b" and "c", and a curved line marked "c" corresponds to the case where the quantity of incident light is the smallest. With lapse of time T, immediately before the VHO voltage that is the next reset voltage is applied, the potentials become a0, b0, c0, respectively, and the quantities of the incident light can be measured from the differences in these potentials. Also, the quantity of the incident light can be measured by measuring the integrated quantity of the current that flows in from the VH1 when the VHO voltage is applied to the TG terminal. In the case of the interline type CCD image sensor, the quantity of the incident light can be measured by measuring the quantity of charge mixed into the CCD when the VH0 voltage is applied to the TG terminal.

In the conventional light receiving device, there is a problem in that, where the quantity of the incident light is large, the lowering of the potential due to the discharge from the reverse biased state of the photodiode ends prior to the lapse of time T which is a reset period, so that only the signal of the same level is outputted with respect to quantities of the light in the vicinity of the quantity of the incident light. This is a saturation state wherein the incident light is not sensed when the quantity of the incident light is beyond a certain quantity. It is necessary for the light receiving device to satisfy the conditions which do not undergo saturation under an expected measuring range and, for this reason, it becomes necessary also to control the sensitivity (that is, spectral-response characteristic).

Further, in the image sensor incorporating the CCD, other additional conditions are combined for controlling the transfer capability of the CCD, the characteristics involved are unavoidably restricted.

As one method for resolving the problem of saturation, there is a practice wherein a reset period T is made short (the operation called a "shutter mode" in image sensors is one of these methods). However, this method is destructive reading in which the signals thus far accumulated are destroyed by the reset operation. Thus, where the signal from low level illumination is involved and a change in potentials is small, there is a deterioration in the S/N sensitivity.

SUMMARY OF THE INVENTION

An object of the invention, therefore, is to overcome the problems existing in the prior art and to provide a device and a method for receiving light used in a CCD image sensor or the like, which enables reading a signal of such a magnitude that cannot be read when a conventional system is used.

According to one aspect of the invention, there is provided a light receiving device comprising:

a photodiode which has both photoelectric conversion and electron charge accumulating functions and is maintained in a floating state after a reverse bias is reset;

a switching element which periodically provides a reverse bias setting potential to the photodiode;

a comparator which compares a potential of the photodiode with a threshold potential externally applied; and a counter which counts a time duration from a point of time when the photodiode is reset by the switching element to a point of time at which the potential of the photodiode exceeds the threshold potential, and outputs the time duration as a numeral value corresponding to quantity of light incident on the light receiving device.

According to the present invention, the output signals of the light receiving device are counted by the time in which the output potential of the photodiode exceeds the threshold potential and, in this way, it is possible to read a signal of such a magnitude that could not have been read due to saturation according to the conventional system wherein an electron charge produced was measured. Furthermore, since the reading is non-destructive, it is possible to carry out the reading a plurality of times.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 1A:
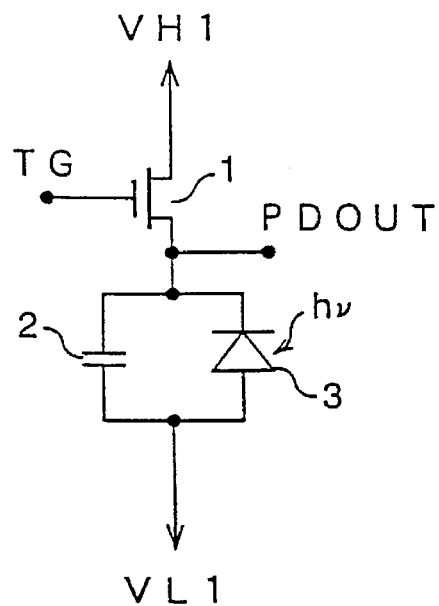
FIG. 1A is a circuit diagram showing a structure of a conventional light receiving element.
Figure 1B:
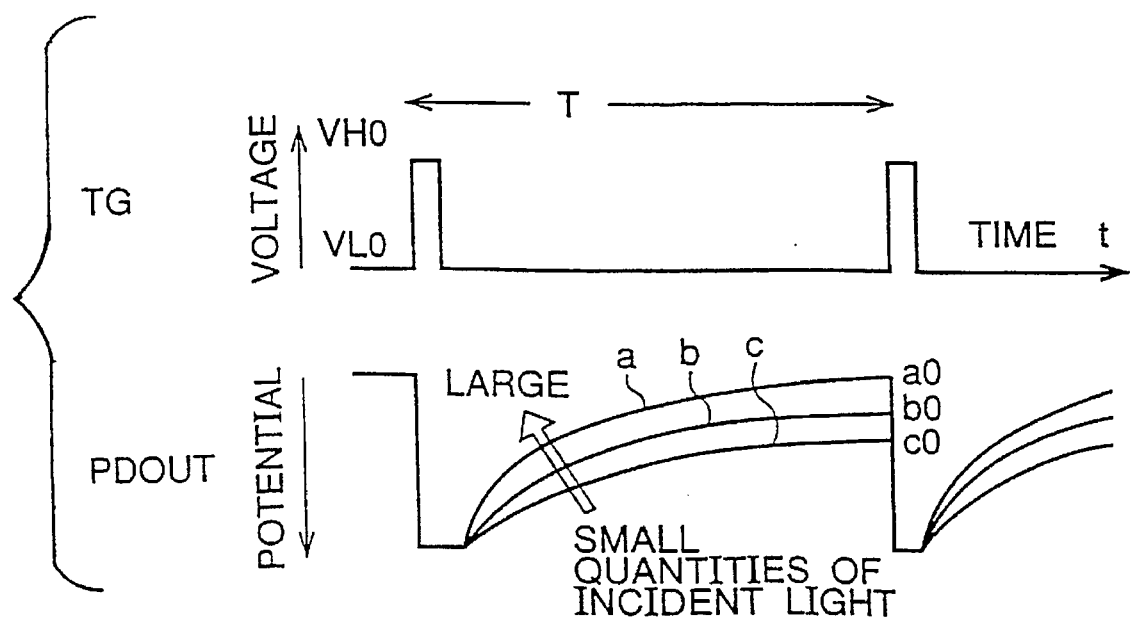
FIG. 1B is a diagram for use in explaining the operation of the conventional light receiving element.
Figure 2:
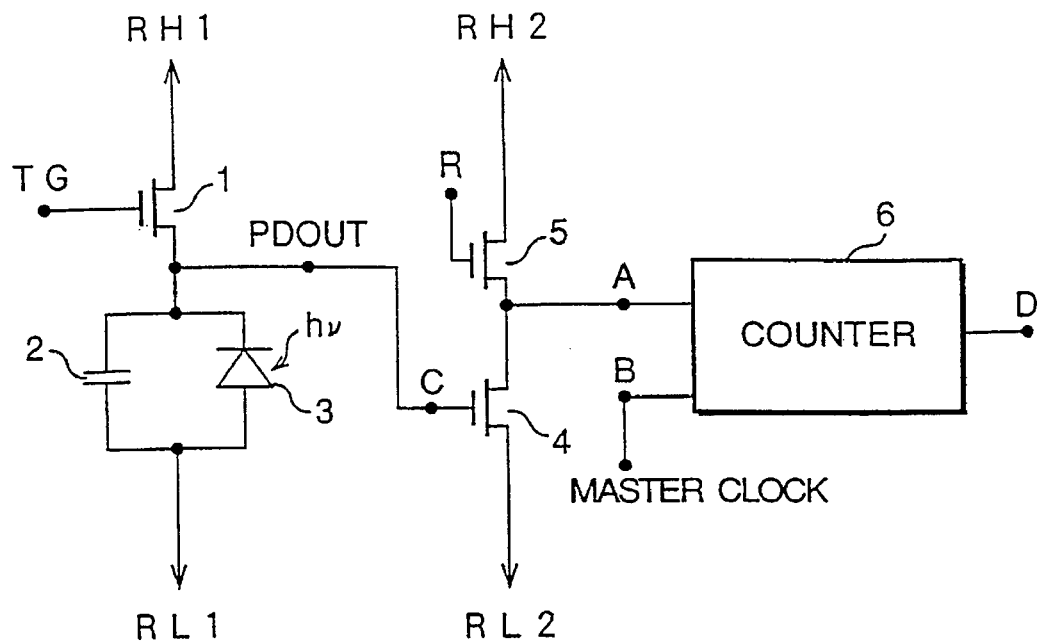
FIG. 2 is a circuit diagram showing a structure of a light receiving element of a first embodiment according to the invention.

FIG. 2 shows a configuration of the light receiving device of the first embodiment of the invention. In addition to the reset element 1 and the photodiode 3 which is reverse biased and has a signal charge electron storing function (represented by the capacitor 2), there are a MOS transistor 4 for non-destructively reading potential changes of the photodiode 3 and another MOS transistor 5 for applying a threshold potential from an external source. The two MOS transistors 4 and 5 constitute a comparator which compares the output potential of the photodiode 3 with the threshold potential externally applied. That is, when the MOS transistor 4 is in a state in which, due to the fact that the potential immediately after the reset operation of the photodiode is high, the flow of source/drain current is larger than that of the MOS transistor that provides the threshold potential, the potential of the output terminal A is closer to the potential RL2 and, inversely, in a state wherein the potential of the photodiode 3 is lower as compared with the threshold potential, the potential closer to the potential RH2 is outputted from the output terminal A. A counter circuit disposed in the stage to follow the comparator outputs as a numerical value the lapse of time from the time when the potential at the terminal A which is also an input terminal of the counter changes from the potential closer to RH2 to the potential closer to RL2, to the time when, inversely, the potential closer to RL2 changes to the potential closer to RH2. Specifically, the counter 6 receives at the input terminal B thereof a high frequency signal as a master clock for counting the time, and counts the time lapsed between the times when the changes occurred. The time counted is outputted to the terminal D at each reset operation.

Figure 3:
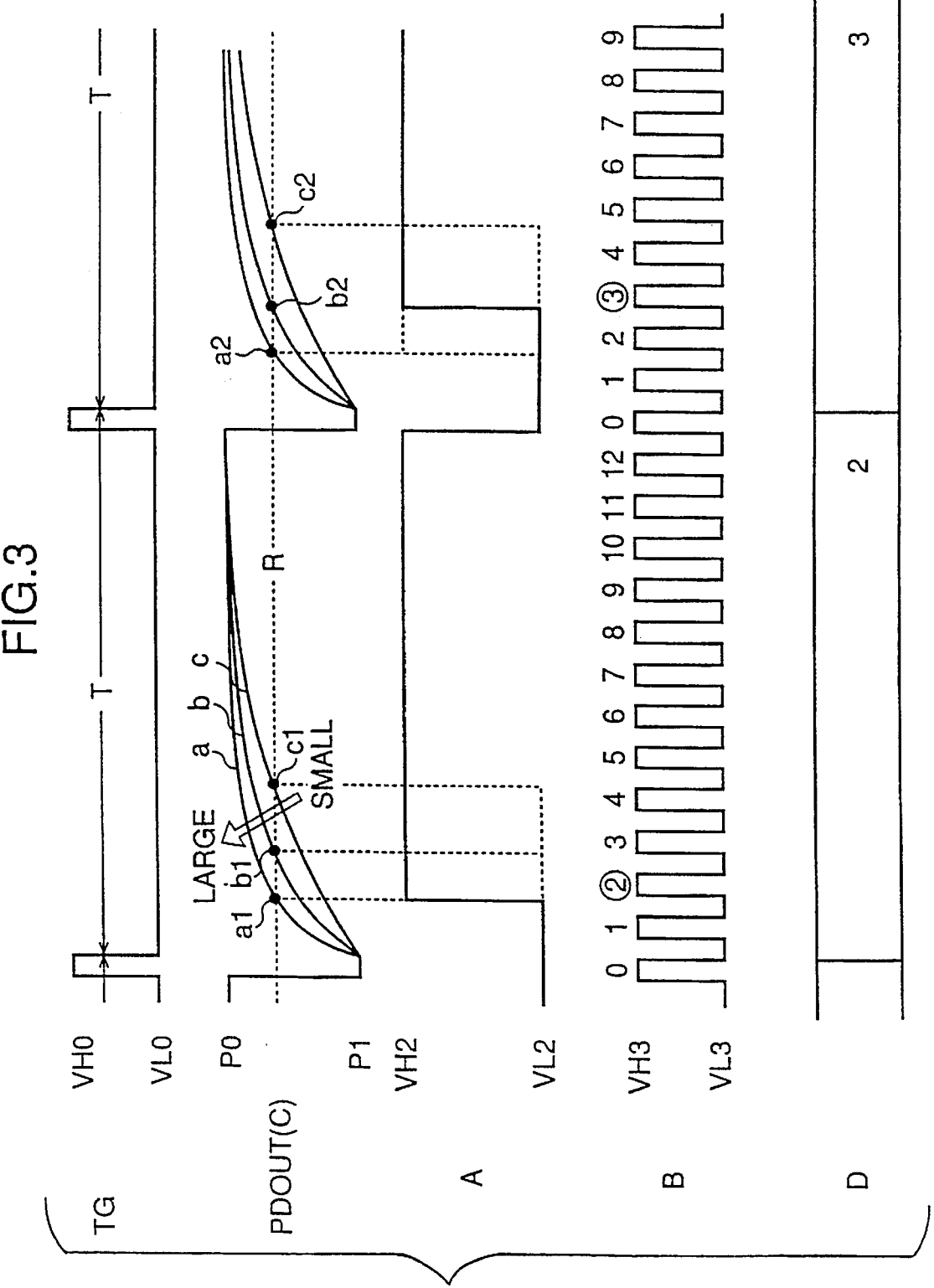
FIG. 3 is a diagram for use in explaining the operation of the light receiving element of the first embodiment according to the invention.

FIG. 3 is for explaining an embodiment of a method for driving the light receiving device according to the invention. In FIG. 3, the input/output potentials or the potential changes in the various terminals of the light receiving device shown in FIG. 2 are represented respectively by A, B, D, TG and PDOUT(C). The clock potential indicated as TG in FIG. 3 is applied to a gate electrode of the reset element 1. The TG clock signal consists of VHO that is ON-potential of the reset element and VLO that is the OFF-potential, and has a cyclic period of time T. By the reset operation wherein the TG clock signal changes from the VLO to VHO, the potential of PDOUT which is one end of the photodiode 3 undergoes potential changes as seen in FIG. 3. When the quantity of the incident light is large, a potential change takes place faster from a reverse biased state, that is, a high potential state, to a low potential state and, under a low light incident state, a potential change takes place slowly as shown by curve "c". Where a threshold potential as represented by R of PDOUT shown in dotted line (in FIG. 3) is provided to the comparator constituted by the MOS transistors 4 and 5, the output potential PDOUT of the photodiode 3 exceeds the threshold potential R after lapse of the time that is dependent on the quantity of the incident light. If the quantity of incident light corresponds to the curve "a", there is formed a rectangular wave whose leading edge rises at the timing of "a1" as shown in a solid line A. As the quantity of incident light varies, the rising timings vary as shown by "b1" and "c1". A counter circuit 6 is coupled to the stage to follow the comparator, and a master clock of B in FIG. 3 is inputted to the master clock input terminal B in FIG. 2, whereby a numerical value as shown by D in FIG. 3 is outputted from an output terminal of the counter circuit 6.

Figure 4:
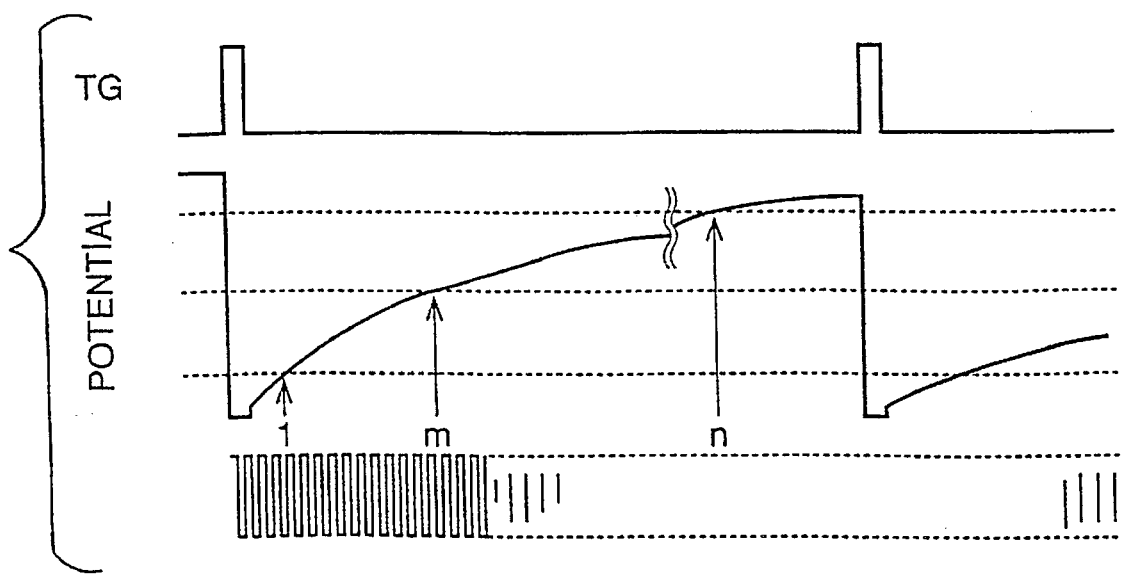
FIG. 4 is a diagram for use in explaining the operation of a light receiving element of a second embodiment according to the invention.

FIG. 4 is for explaining another embodiment of a method for driving the light receiving device according to the invention, wherein a plurality of threshold potentials to be inputted to the comparator are provided, and a plurality of intersecting time points, as l, m, n, are outputted. The reading of the PDOUT potential is done through the MOS gate connection of high input impedance, which enables the reading to be non-destructive and be repeatable. The inputting of the threshold potentials can be realized by an arrangement wherein a plurality of comparators are connected in parallel with counters being connected respectively thereto, or by an arrangement wherein AC waves are inputted to the MOS transistor 5 for inputting the threshold value.

According to the present invention, the output signals of the light receiving device are counted by the time in which the potential of the photodiode exceeds the threshold value and, in this way, it is possible to read a signal of such a magnitude that could not have been read due to saturation according to the conventional system wherein an electron charge produced was measured. Furthermore, since the reading of the potential is non-destructive, it is possible to carry out the reading a plurality of times.

While the invention has been described in its preferred embodiments, it is to be understood that the words which have been used are words of description rather than limitation and that changes within the purview of the appended claims may be made without departing from the true scope spirit of the invention as defined by the claims.

What is claimed is:

1. A light receiving device comprising:

a photodiode, having spectral-response characteristics that change depending on a reverse bias state, for both photoelectric conversion and electron charge accumulation, said photodiode being maintained in a floating state after said reverse bias is reset;

a switching element for periodically providing a reverse bias resetting potential to said photodiode;

a comparator for comparing a potential of said photodiode with a threshold potential corresponding to predetermined spectral-response characteristics; and a counter for counting a time duration from when said photodiode is reset by said switching element to when the potential of said photodiode exceeds said threshold potential, and outputting the time duration as a numerical value corresponding to a quantity of light incident on said light receiving device.

2. A method for driving a light receiving device having a comparator and a counter, in which a reverse bias reset potential is provided to a photodiode by periodically applying a reset potential to said photodiode and during a time period from immediately after a provision of a first reset potential to a time when a next reset potential is provided, said photodiode receives light and is maintained in a floating state and undergoes a reverse bias attenuation change operation responsive to quantities of received light, said method comprising steps of:

providing a threshold potential to said comparator;

inputting, to said comparator, an output potential of said photodiode;

inputting an output of said comparator to said counter;

counting a time duration from when said first reset potential is provided to when said output potential of said photodiode equals said threshold potential; and outputting said time duration as numerical value each time said reset potential is provided, said counting of the time duration being carried out by counting a number of pulses of a master clock inputted to a clock input terminal of said counter, and said potential of the photodiode and said threshold potential being compared non-destructively at a plurality of levels whereby spectral-response characteristics of the light incident on said light receiving device are obtained.

* * * * *